Dec. 29, 1964  J. L. SMEDLEY  3,163,770
REMOTE STARTING ARRANGEMENT FOR AUTOMOBILE ENGINES
Filed Nov. 28, 1961  2 Sheets-Sheet 1
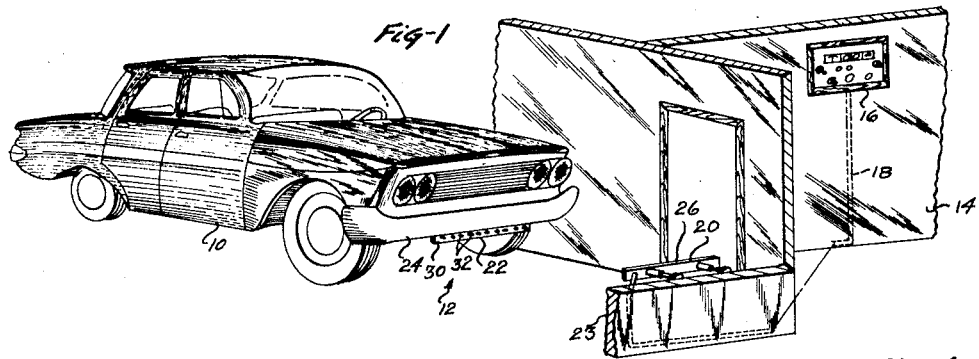
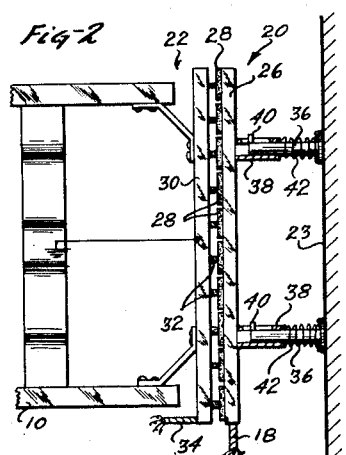
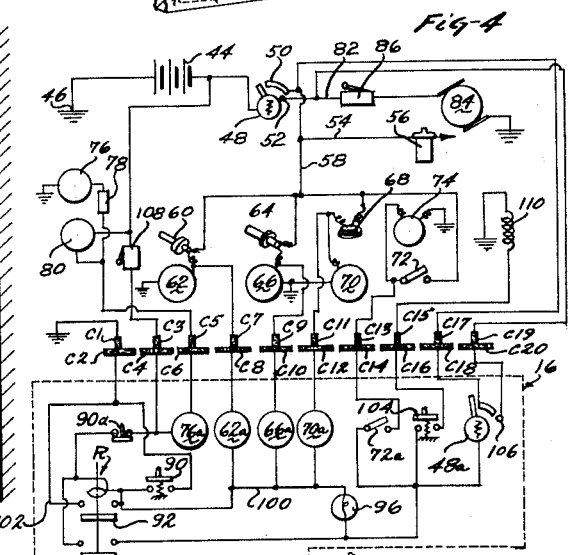
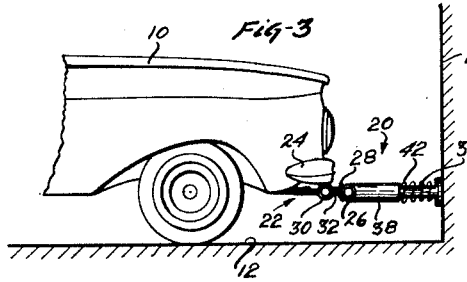
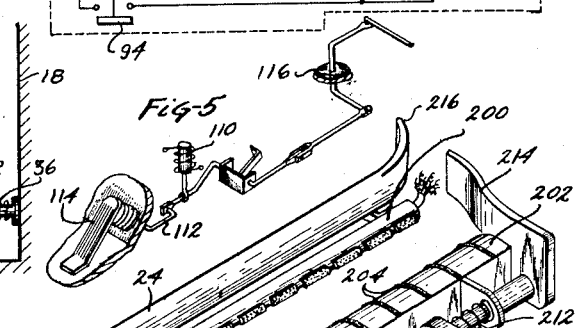
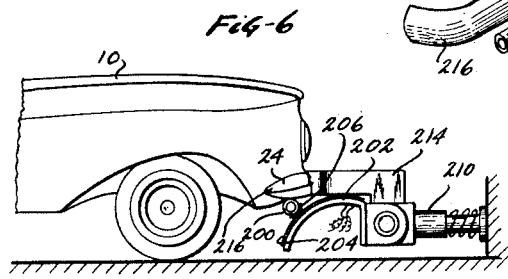
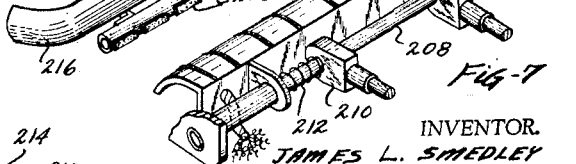
INVENTOR.
JAMES L. SMEDLEY
BY
Toulmin & Toulmin
ATTORNEYS Dec. 29, 1964   J. L. SMEDLEY   3,163,770
REMOTE STARTING ARRANGEMENT FOR AUTOMOBILE ENGINES
Filed Nov. 28, 1961   2 Sheets-Sheet 2
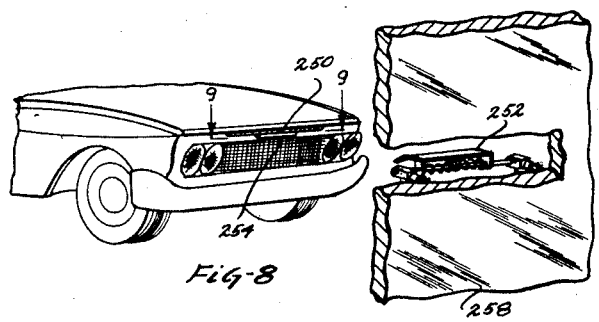
FIG-8
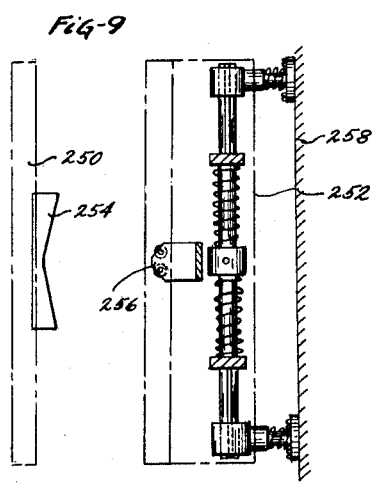
FIG-9
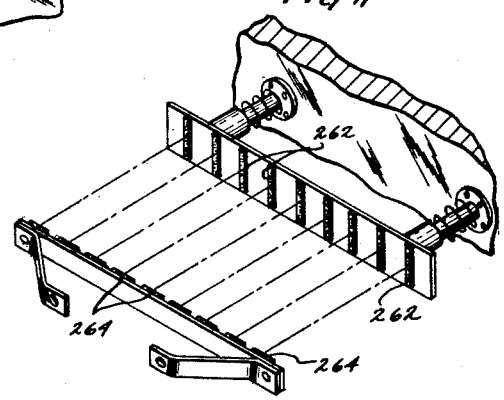
FIG-11
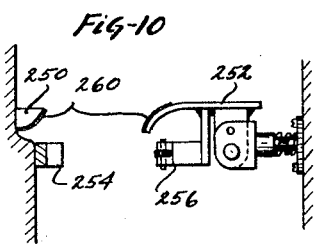
FIG-10
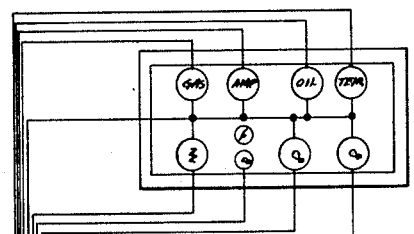
FIG-13
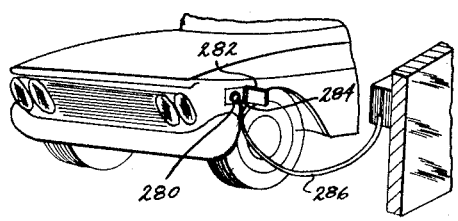
FIG-12
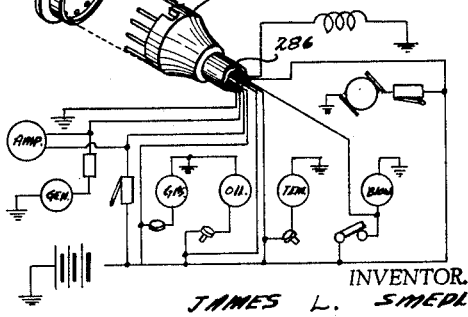
INVENTOR.
JAMES L. SMEDLEY
BY
Toulmin & Toulmin
ATTORNEYS United States Patent Office 3,163,770
Patented Dec. 29, 1964

3,163,770
REMOTE STARTING ARRANGEMENT FOR
AUTOMOBILE ENGINES
James L. Smedley, 113 Barbour St., Moorehead, Ky.
Filed Nov. 28, 1961, Ser. No. 155,435
3 Claims. (Cl. 290—38)

This invention relates to a remote starting arrangement for automobile engines and is particularly concerned with such an arrangement wherein the connection of the remote starting unit with the electrical system of the automobile is effected by driving the automobile into a predetermined position.

Many times in the winter, automotive vehicles will be fully exposed to the elements, and, even in cases where a car port is provided, the vehicle will become quite cold over night. It is well known that a vehicle should not be driven until the engine is warmed up on account of the extremely rapid wear that takes place in the engine under these conditions. Also, a vehicle engine has to be run for a certain length of time before the temperatures comes up to the point where the heating appliances for warming the passenger space become effective.

Having the foregoing in mind, it is a primary object of the present invention to provide an arrangement for starting a vehicle engine from a remote position, for example, from inside a dwelling.

Another object of this invention is the provision of a remote starting arrangement for an automotive vehicle such that the arrangement is made effective or ineffective by movement of the vehicle so that upon parking the vehicle, connection will be made with the arrangement for remote starting to be made automatically, and removing the vehicle from its parking position will automatically interrupt the connection.

Still another object of this invention is the provision of a remote starting arrangement for an automotive vehicle in which the remote arrangement provides for complete control of the vehicle engine and also has a complete set of indicating instruments so that the exact condition of operation of the engine can be ascertained from the remote position.

Still another object of this invention is the provision of a connector device for connecting a remote starting panel with the various auxiliaries of an automotive vehicle and which connector device is arranged for automatically aligning with a corresponding connector device carried by the vehicle merely by driving the vehicle to a predetermined parking position.

These and other objects and advantages of this invention will become more apparent upon reference to the following specification, taken in connection with the accompanying drawings, in which:

FIGURE 1 is a perspective view showing a vehicle and a remote starting panel and the devices for connecting the remote panel with the auxiliaries in the vehicle;

FIGURE 2 is a somewhat diagrammatic plan view looking down on top of the connector devices, the one being mounted on the vehicle and the other being stationarily mounted;

FIGURE 3 is a view looking in from the side of FIGURE 2 showing the manner in which the connector devices meet when the vehicle is driven to a predetermined position;

FIGURE 4 is a diagrammatic representation of the principal auxiliaries of the vehicle and the switches and instruments and the like on the control panel that are connected therewith by means of the connector devices;

FIGURE 5 is a more or less diagrammatic view showing a manner in which the accelerator linkage of the vehicle can be provided with a solenoid operator to enable the throttle to be opened by actuation of a switch on the remote control panel;

FIGURE 6 is a more or less diagrammatic side view showing a modified construction of the connector devices embodying a wiping contact arrangement and a centering device;

FIGURE 7 is a perspective view of the connector arrangement of FIGURE 6;

FIGURE 8 is a perspective view showing the mounting of a connector bar on a vehicle toward the upper part of the front thereof and showing a cooperating connector bar stationarily mounted for engagement therewith;

FIGURE 9 is a diagrammatic plan view indicated by line 9—9 on FIGURE 8 and showing an automatic aligning arrangement associated with the connector devices;

FIGURE 10 is a sectional view showing the form which the contacts of the connector devices might take;

FIGURE 11 is a perspective view showing how the contact elements of the connector devices could be respectively vertical for one connector device and horizontal for the other thereby providing a substantial area within which contact between corresponding elements could be made;

FIGURE 12 is a diagrammatic fragmentary view showing how a remote panel according to the present invention could be connected with the vehicle auxiliaries by means of a plug-in device; and FIGURE 13 is a diagrammatic representation of the electrical circuit pertaining to the modification of FIGURE 12.

Referring to the drawings somewhat more in detail, in FIGURE 1, the vehicle is indicated at 10. This vehicle is illustrated as being positioned in a parking area 12 which might be a car port, for example. Located within the dwelling 14 positioned adjacent the parking area is a remote control panel 16 by means of which the engine of the vehicle can be started without leaving the dwelling. Panel 16 has a cable 18 leading therefrom that leads to a stationarily mounted connector device 20 which may be positioned on any suitable support, for example, a wall member 23 of the car port.

A similar connector device 22 is mounted on the vehicle, preferably, at the front end, and, as illustrated in FIGURE 1, in the region of the bottom of the front bumper 24.

As will be seen in FIGURE 2, connector device 20 consists of an elongated support bar 26 having insulatingly mounted thereon a plurality of individual contact elements 28. These elements are connected with the individual wires making up the aforementioned cable 18.

The car mounted connector device 22 is similarly constructed of a support bar 30 having insulatingly mounted thereon contact elements 32 which are connected with individual wires of a cable 34 leading from connector device 22 back into vehicle 10.

Bar 26 of the stationarily mounted connector device 20 is preferably resiliently supported on support 23. This may be accomplished in a number of different manners but what I show are plungers 36 carried by support 23 and receiving thereover sleeves 38 attached to bar 26. The sleeves 38 are slotted and receive stop pins 40 carried by plungers 36 so that bar 26 has limited freedom of movement on the plungers. Springs 42 urge the bar 26 away from support 23 but permit it to yield toward the support when the car is driven into its park position.

The electrical connections between the auxiliaries of the vehicle and the various instruments and switches of the remote control panel are illustrated in the electrical diagram of FIGURE 4. In FIGURE 4, the vehicle battery is represented at 44 and it has one terminal grounded at 46. The ungrounded side of the battery leads to ignition switch 48 which has an off position in which it is illustrated and an on position where the wire leading from the ungrounded side of the battery is connected to a contact element 50.

Switch 48 has still another position wherein the ungrounded side of the battery is also connected to a terminal 52 leading to the starting motor for the vehicle.

As will be seen in FIGURE 4, contact element 50 is connected by a wire 54 with the ignition system of the vehicle represented by the coil 56. Contact element 50 is also connected by a wire 58 with one side of a pressure element 60, the other side of which is connected to one side of an oil pressure gauge 62, the other side of which gauge is grounded. This gauge serves to indicate whether or not the engine, when operating is developing the proper oil pressure.

Wire 58 is also connected with one side of a temperature sensitive element 64, the other side of which is connected with one side of a temperature gauge 66, the other side of which is grounded. Gauge 66 serves to indicate the temperature at which the engine is operating. Wire 58 is also connected with one side of the liquid level sensitive element 68 located in the gasoline tank of the vehicle. The other side of element 68 is connected with one side of a gas gauge 70, the other side of which is grounded.

Wire 58 also leads to one side of a control switch 72, the other side of which is connected with one side of blower motor 74, the other side of which is grounded. The blower motor is associated with the heater for the vehicle in a well known manner.

The vehicle engine also has associated therewith a generator 76 which supplies electric current through a regulator 78 and an ammeter 80 to battery 44.

Leading from contact element 52 of ignition switch 48 is a wire 82 that leads to the starter motor 84 so that the starter motor can be energized when the ignition switch is turned to an extreme position. Wire 82 has embodied therein a switch 86 that is closed only when the shift lever of the vehicle is in a neutral position.

The foregoing instruments and switches are substantially conventional with automotive vehicles and no attempt has been made to show these elements exactly as they might be positioned or connected because such details are subject to wide variation from one vehicle to another. What has been illustrated, however, are the most essential indicating instruments and operating auxiliaries.

Turning now to the remote control panel 16, which is indicated in dot-dash outline toward the bottom of FIGURE 4, there is carried by this panel an ammeter 76a, an oil pressure gauge 62a, a temperature gauge 66a, a gas gauge 70a, an ignition switch 48a, and a switch 72a for the vehicle heater blower motor. These instruments and switches find their counterpart in the instruments and switches of the vehicle itself and, accordingly, are demonstrated by corresponding numbers with the addition of the subscript *a*.

In addition to the aforementioned switches and indicating devices, the remote control panel has an on-off switch 90 which is operative, when the vehicle is parked in the proper position, to bring about energization of a relay R which has a holding blade 92 bypassing switch 90 and a second blade 94 connected in circuit with the switches 72a, 104, and 48a. When the car is in park position with the connector devices in engagement, the control panel will remain idle until switch 90 is depressed to energize relay R. Thereafter, as long as the car remains in park position, the remote panel will be effective. Switch 90a is a normally closed switch which can be depressed to deenergize relay R at any time.

As soon as the vehicle is removed from the aforementioned position, however, the relay R will be deenergized and will drop open and the control panel will, thus, be inoperative when the vehicle is again driven into its park position until switch 90 is again depressed.

For indicating when relay R is energized, there is a signal light 96 provided which is illuminated when the relay is closed and which is dark when the relay is open.

With regard to the electrical connections between the remote panel instruments and switches and those in the vehicle, this is accomplished by the connector devices 20 and 22. Connector device 22 has a contact element C1 which is connected with ground and which engages a contact element C2 which is the return ground line leading from the control panel.

Contact element C3 of connector device 22 engages contact element C4 of connector device 20 and element C4 is connected with one side of the coil of relay R and with one of the contacts of blade 94.

Contact element C5 of connector device 22 engages contact element C6 of connector device 20 and contact element C6 is connected with one side of ammeter 76a of the remote control panel while the other side thereof is connected with contact C4.

Similarly, contact element C7 of connector device 22 engages contact element C8 of connector device 20. Contact element C8 is connected with one side of oil pressure gauge 62a of the control panel with the one side thereof being connected with wire 100. Wire 100 is connected with one side of holding blade 92.

Contact element C9 of connector device 22 engages contact element C10 of connector device 20. Contact element C10 is connected with one side of temperature gauge 66a of the remote control panel with the other side thereof being connected with ground wire 100.

Contact element C11 of connector device 22 engages contact element C12 of connector device 20 which is connected to one side of the gasoline gauge 70a, the other side of which is connected to ground wire 100.

Contact element C13 of connector device 22 engages contact element C14 of connector device 20 which is connected to one side of switch 72a, the other side thereof being connected with one side of blade 94.

Contact element C15 of connector device 22 engages contact element C16 of connector device 20 which is connected to one side of a switch 104, the other side of which is connected to one side of blade 94.

Contact element C17 of connector device 22 engages contact element C18 of connector device 20 which is connected with one side of ignition switch 48a and the other side thereof being connected with one side of blade 94.

A final connection between the connector devices is effected by contact elements C19 and C20, the latter being connected to the terminal 106 of ignition switch 48a.

Each of the contact elements of connector device 22 is connected with the corresponding instrument or switch as illustrated in FIGURE 4.

Accordingly, contact element C1 is grounded to the frame of the vehicle while contact element C3 is connected through a switch 108 with the ungrounded terminal of the battery 44. Switch 108, which is optional, is adapted for being closed by the emergency brake of the vehicle when it is in brake position.

Contact element C5 is connected with the generator side of ammeter 80 so that the ammeter 76a of the remote control panel becomes connected in parallel with ammeter 80.

Similarly, contact element C7 is connected with the gauge side of pressure sensitive element 60. Contact element C9 is connected with the gauge side of temperature sensitive element 64 and contact element C11 is connected with the gauge side of liquid level sensitive element 68.

Contact element C13 is connected to the switch side of blower motor 74. Switch 72 is open when not in use. Contact element C17 is connected with terminal 50 of ignition switch 48 which leads by way of wire 54 to the ignition system of the vehicle.

Contact element C19 is connected with terminal 52 of ignition switch 48 and which leads by wire 82 through switch 86 to starter motor 84.

Contact element C15 is connected with a solenoid 110, the other side of which is grounded, and which solenoid is diagrammatically illustrated in FIGURE 5. This solenoid is connected with linkage 112 leading from accelerator pedal 114 to carburetor 116. The arrangement is such that energization of solenoid 110 will actuate the linkage to open the butterfly valve of the carburetor and increase the fuel supply to the engine.

The appearance of the connector devices 20 and 22, when they are in engagement, will be seen in both FIGURES 2 and 3. In these figures, it will be noted that the contact elements pertaining to one of the connector devices extends in the vertical direction and those on the other connector device extend in the horizontal direction. The contact elements will, thus, engage properly even though there is some lateral or vertical displacement of the connector devices relative to each other.

FIGURES 6 and 7 show a modified arrangement wherein the connector device mounted on the front of the car is indicated at 200 and the stationarily mounted connected device is indicated at 202. The stationarily mounted device comprises arcuate contact elements 204 adapted for wipingly engaging contact elements 206 carried by the vehicle. This modification also shows an arrangement for automatically effecting exact alignment of the stationarily mounted connector device with that carried by the vehicle. The connector device 202 is attached to a carrier bar 208 that is slidable in the supporting brackets 210. Springs 212 resiliently center the connector device as illustrated. However, each end of support bar 208 carries an outwardly extending wing element 214 adapted for engagement with the adjacent end 216 of the vehicle bumper so that as the vehicle approaches the proper position, connector device 202 will align itself with the car bumper and, thus, with connector device 202 mounted on the car bumper, therefore, insuring proper inter-engagement of the connector devices.

The wiping type engagement between the contact elements also serves to maintain the contact elements clean at all times.

FIGURES 8, 9 and 10 show a slightly modified arrangement wherein the connector device 250 is mounted toward an upper part of the front end of the vehicle whereby it is less subject to becoming soiled with mud or tar and the stationarily mounted connector device 252, of course, is similarly mounted at an elevated location.

One of the connector devices, as, for example, device 250, carries a cam 254 while connector device 252 has roller means 256 for engagement with the cam. Connector device 252 is slidably mounted on support means 258 so that as the car approaches its parked position, the stationarily mounted connector device will shift laterally, if necessary, into a position of exact alignment with the vehicle mounted connector device.

As in the case of the last described modification, the contact elements 260 of the connector devices are arranged for wiping engagement whereby their contacting areas are maintained clean.

FIGURE 11 shows somewhat diagrammatically the vertical and horizontal arrangement of the contact elements for two connector devices such that considerable vertical or lateral misalignment would be possible while still effecting the proper connections. The vertical contact elements in FIGURE 11 are indicated at 262 and the horizontally arranged elements are illustrated at 264. The horizontal elements are not long enough to bridge between any two adjacent vertically disposed elements so that there is no possibility of establishing any short circuits.

FIGURES 12 and 13 show a modified arrangement in which, instead of connector devices that establish connections in response to movement of the vehicle into a predetermined parked position, there is provided receptacle 280 on the vehicle, on the side of the front fender, for example, adapted for being covered by pivoted door 282. This receptacle is adapted for receiving a plug 284 on the end of a cable 286 leading to a remote control panel of the nature previously described.

FIGURE 13 shows the electrical connections leading from the receptacle 280 and the plug 284 to the auxiliaries in the vehicle and in the remote control panel respectively.

From the foregoing, it will be seen that, once connection has been established between the remote control panel and the auxiliaries in the vehicle, substantially complete control of the vehicle engine and the heater in the vehicle can be accomplished from the remote control panel.

This remote control panel is not made effective merely by bringing the connector devices together, but depends upon the operation of the control push button 90 and the relay R and this same means, namely, the relay R, is effective for making the panel ineffective as soon as the vehicle is backed away from its predetermined parked position. Thus, the vehicle can be started from the remote control panel by operating ignition and starter switch 48a and this switch can be left in its motor on position and when the vehicle is backed away so that the connector devices separate, relay R will drop out and when the vehicle is returned to its parked position, the switch 48a, even if in its ignition on position, will not be effective because blades 92 and 94 of relay R will be open.

Whenever relay R is closed, signal light 96 will be illuminated so that it is always possible to ascertain whether or not the remote control panel is in effective condition.

Method of Operation

When the operator desires to start the engine from the dwelling 14, off-on switch 90 on remote panel 6 is closed causing electricity from battery 44 to travel through brake switch 108 through contacts C3 and C4, through switch 90a, through relay R, through switch 90 and through contacts C2 and C1 to the ground side of battery 44.

Since relay R is now energized, its holding blade 92 and second blade 94 are now closed. Holding blade 92 keeps relay R energized, and blade 94 completes the circuit to signal light 96, switch 104 for accelerator solenoid 110, ignition switch 48a, and switch 72a for the car heater.

Turning on ignition switch 48a causes electricity to flow through contacts C18 and C17, through line 54 to the ignition system represented by coil 56 and also through line 58.

From line 58 a line is led to pressure element 60, through contacts C7 and C8 through oil gauge 62a and to ground wire 100, thereby indicating oil pressure at panel 16.

From line 58 a line is also led through temperature sensitive element 64, through contacts C9 and C10, through temperature gauge 66a and to ground wire 100, thereby indicating engine temperature at panel 16.

A third line from 58 is led through liquid level sensitive element 68 in the gasoline tank through contacts C11 and C12 through gasoline gauge 70a and to common ground 100, thereby activating gas gauge 70a at panel 16.

When switch 48a is activated to connect a second terminal 106, the current flows through contacts 20 and 19 through lead wire 82, and through gear shift switch 86 to energize starter 84 and thereby start the engine.

If additional fuel above the ordinary idling rate is required by the engine, switch 104 can be closed to energize solenoid 110 which in turn will actuate the linkage to open the butterfly valve of the carburetor, increasing the fuel supply to the engine.

During the warming up of the engine, the gauges on panel 16 can be viewed to determine whether or not the engine is running properly. When the engine is warm, switch 72 can be closed thereby energizing blower 74 in the car heater.

When it is desired to drive the car, the ignition switch in the car is turned on to keep the engine running while the car is backed away to separate connector devices 20 and 22.

Upon breaking contact between connector devices 20 and 22, relay R will be de-energized, thereby de-energizing the entire panel 16.

Upon returning the car to its parking position, the car is aligned to bring connector devices 20 and 22 into contact with each other. The remote starting procedure can be repeated as desired.

It will be understood that this invention is susceptible to modification in order to adapt it to different usages and conditions; and, accordingly, it is desired to comprehend such modifications within this invention as may fall within the scope of the appended claims.

I claim:

1. In a remote starting arrangement for the engine of an automobile having a battery, a starter motor, and an ignition system; a first connector device carried by the automobile and including first contact elements and conductors connecting said elements to said battery and starter motor and ignition system, a second connector device stationarily mounted independently of said automobile, and also including second contact elements, a remote control panel, a switch on the panel, conductors connecting said switch to said second contact elements, said first and second contact elements in contact with one another in response to parking of the automobile in a predetermined position thereby operatively to connect the switch on the remote control panel in circuit with the battery and starter motor and ignition system, a relay on the panel interrupting the connection between the switch and the said second contact element of the second connector device pertaining to the connection of the switch to the battery, switch means on the panel operable for energizing said relay thereby to complete the connection from said switch to the said contact element, and said relay including a holding circuit extending through said connector devices whereby movement of said automobile from said parked position will interrupt said holding circuit and de-energize said relay.

2. In a remote starting arrangement for the engine of an automobile having a storage battery, an ignition system, a starter motor, conductors connecting said battery with said ignition system and said starter motor, and an automobile bumper, said arrangement comprising, a first connector device having first contact elements insulatingly mounted thereon in horizontally distributed relationship, said connector device being horizontally mounted on said bumper, a second connector device mounted independently of said automobile and being laterally shiftable, arcuate contact elements insulatingly mounted on said second connector in horizontally distributed relationship, aligning means on said second connector device to engage said bumper and laterally shift said connector device so as to bring said first and second contact elements into wiping engagement as said bumper engages said aligning means, said first and second contact elements in wiping engagement with each other, a remote panel, first and second switches on said panel, conductors connecting said switches with said second contact elements, conductors connecting said first contact elements with said storage battery, ignition system and starter motor, a relay on said panel being operable by said first switch thereon and energizable by said battery, said relay upon being energized completing a circuit from said battery to said second switch on said panel through said second and first contact elements to energize said ignition system and said starter motor thereby starting said engine, said relay including a holding circuit extending through said first and second contact elements which is interrupted by movement of said bumper away from said second connector device thereby de-energizing said relay and said switches on said panel.

3. In a remote starting arrangement for the engine of an automobile having a storage battery, an ignition system, a starter motor, engine operating instruments, conductors connecting said battery with said ignition system, said starter motor, and said engine operating instruments, a carburetor having linkage to increase the fuel supply of gasoline to said engine, a heater and blower motor, and an automobile bumper, said arrangement comprising; a first connector device having first bar contact segments insulatingly mounted and laterally spaced thereon in horizontally distributed relationship and said device being horizontally mounted on said bumper, a second connector device laterally movable and horizontally mounted on a stationary member independent of said automobile, arcuate second contact segments insulatingly mounted on said second connector device in horizontally distributed relationship and being of a width less than the space between said first segments, aligning means on said second connector device to engage said bumper and laterally shift said second connector device so as to bring said first and second contact elements into wiping engagement as said bumper engages said aligning means, said first and second contact elements in wiping engagement with each other, a remote panel with switches and operating gauges thereon, said gauges being responsive to said engine operating instruments, conductors connecting said switches and gauges with said second contact elements for completing the circuit from said panel to the said battery thereby to make the devices effective for controlling the said engine and for indicating the operating conditions thereof, conductors connecting said first contact elements with said storage battery, said ignition system, said starter motor and said engine operating instruments, a relay on said panel being energized by said battery through a first switch on said panel, said relay being energized, completing a circuit from said battery to a second switch on said panel through said second and first contact elements to energize said ignition system and said starter motor thereby starting said engine, said relay including a holding circuit extending through said first and second contact elements which is de-energized by movement of said bumper away from said second connector device thereby de-energizing said relay and said switches on said panel, a solenoid to actuate said carburetor linkage, a third switch on said panel to actuate said solenoid and thereby increase the fuel supply to said engine, and a fourth switch on said panel to actuate said blower motor and thereby heat said automobile when desired.

References Cited in the file of this patent

UNITED STATES PATENTS

| | | |
|---|---|---|
| 1,703,906 | Stevens | Mar. 5, 1929 |
| 2,544,955 | Harrelson | Mar. 13, 1951 |
| 2,569,332 | Perkins | Sept. 25, 1951 |
| 2,591,618 | Schaeffer | Apr. 1, 1952 |
| 2,739,247 | Pope | Mar. 20, 1956 |
| 2,817,022 | Corner | Dec. 17, 1957 |
| 2,873,382 | Herring | Feb. 10, 1959 |
| 2,936,348 | Adcox | Mar. 10, 1960 |
| 2,952,782 | Woyden | Sept. 13, 1960 |